United States Patent
Zhu et al.

(10) Patent No.: US 11,782,606 B2
(45) Date of Patent: *Oct. 10, 2023

(54) SCANNING TECHNIQUES FOR A MEDIA-MANAGEMENT OPERATION OF A MEMORY SUB-SYSTEM

(71) Applicant: Micron Technology, Inc., Boise, ID (US)

(72) Inventors: Fangfang Zhu, San Jose, CA (US); Wei Wang, Dublin, CA (US); Jiangli Zhu, San Jose, CA (US); Ying Yu Tai, Mountain View, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/730,958

(22) Filed: Apr. 27, 2022

(65) Prior Publication Data
US 2022/0326856 A1  Oct. 13, 2022

Related U.S. Application Data

(63) Continuation of application No. 16/555,997, filed on Aug. 29, 2019, now Pat. No. 11,320,987.

(51) Int. Cl.
*G06F 3/06* (2006.01)
(52) U.S. Cl.
CPC .......... *G06F 3/0616* (2013.01); *G06F 3/0653* (2013.01); *G06F 3/0659* (2013.01); *G06F 3/0673* (2013.01)

(58) Field of Classification Search
CPC .... G06F 3/0616; G06F 3/0653; G06F 3/0659; G06F 3/0673; G06F 2212/7211; G06F 3/064; G06F 12/0246; G06F 3/0679; G06F 2212/7201; G11C 16/3495
See application file for complete search history.

(56) References Cited

U.S. PATENT DOCUMENTS

| | | | |
|---|---|---|---|
| 2007/0294490 A1* | 12/2007 | Freitas | G06F 13/1668 711/154 |
| 2015/0261671 A1* | 9/2015 | Chu | G06F 12/0246 711/103 |
| 2016/0019141 A1* | 1/2016 | Sutardja | G11C 16/3495 711/103 |
| 2018/0107592 A1* | 4/2018 | Hashimoto | G06F 3/0619 |
| 2018/0113620 A1* | 4/2018 | Kwon | G06F 12/0246 |
| 2019/0212935 A1* | 7/2019 | Egbert | G06F 12/0811 |
| 2019/0272115 A1* | 9/2019 | Hu | G06F 3/0683 |

(Continued)

*Primary Examiner* — Khoa D Doan
*Assistant Examiner* — Tong B. Vo
(74) *Attorney, Agent, or Firm* — Holland & Hart LLP

(57) ABSTRACT

Methods, systems, and devices for memory can include techniques for identifying first quantities of write counts for a first plurality of super management units (SMUs) in a mapped region of a memory sub-system, identifying, by a hardware component of the memory sub-system, a first SMU of the first plurality that includes a fewest quantity of write counts of the first quantity of write counts, and performing a wear-leveling operation based at least in part on a first quantity of write counts of the first SMU of the first plurality in the mapped region being less than a second quantity of writes counts of a second SMU of a second plurality of SMUs in an unmapped region of the memory sub-system.

20 Claims, 5 Drawing Sheets

(56) References Cited

U.S. PATENT DOCUMENTS

| | | |
|---|---|---|
| 2020/0097398 A1* | 3/2020 | Saviotti .................. G06F 11/076 |
| 2020/0192791 A1* | 6/2020 | Yang ........................ H04L 1/203 |
| 2021/0042060 A1* | 2/2021 | Kim ....................... G06F 3/0659 |
| 2021/0055885 A1* | 2/2021 | Strathman ............... G06F 3/067 |

* cited by examiner

SCANNING TECHNIQUES FOR A MEDIA-MANAGEMENT OPERATION OF A MEMORY SUB-SYSTEM

CROSS REFERENCE

The present application for patent is a continuation of U.S. patent application Ser. No. 16/555,997 by Zhu, et al., entitled "SCANNING TECHNIQUES FOR A MEDIA-MANAGEMENT OPERATION OF A MEMORY SUB-SYSTEM," filed Aug. 29, 2019, assigned to the assignee hereof, and is expressly incorporated by reference in its entirety herein.

TECHNICAL FIELD

The following relates generally to a memory sub-system and more specifically to scanning techniques for a media management operation of the memory sub-system.

BACKGROUND

A memory sub-system can include one or more memory components that store data. The memory components can be, for example, non-volatile memory components and volatile memory components. In general, a host system can utilize a memory sub-system to store data at the memory components and to retrieve data from the memory components.

DETAILED DESCRIPTION

Figure 1:
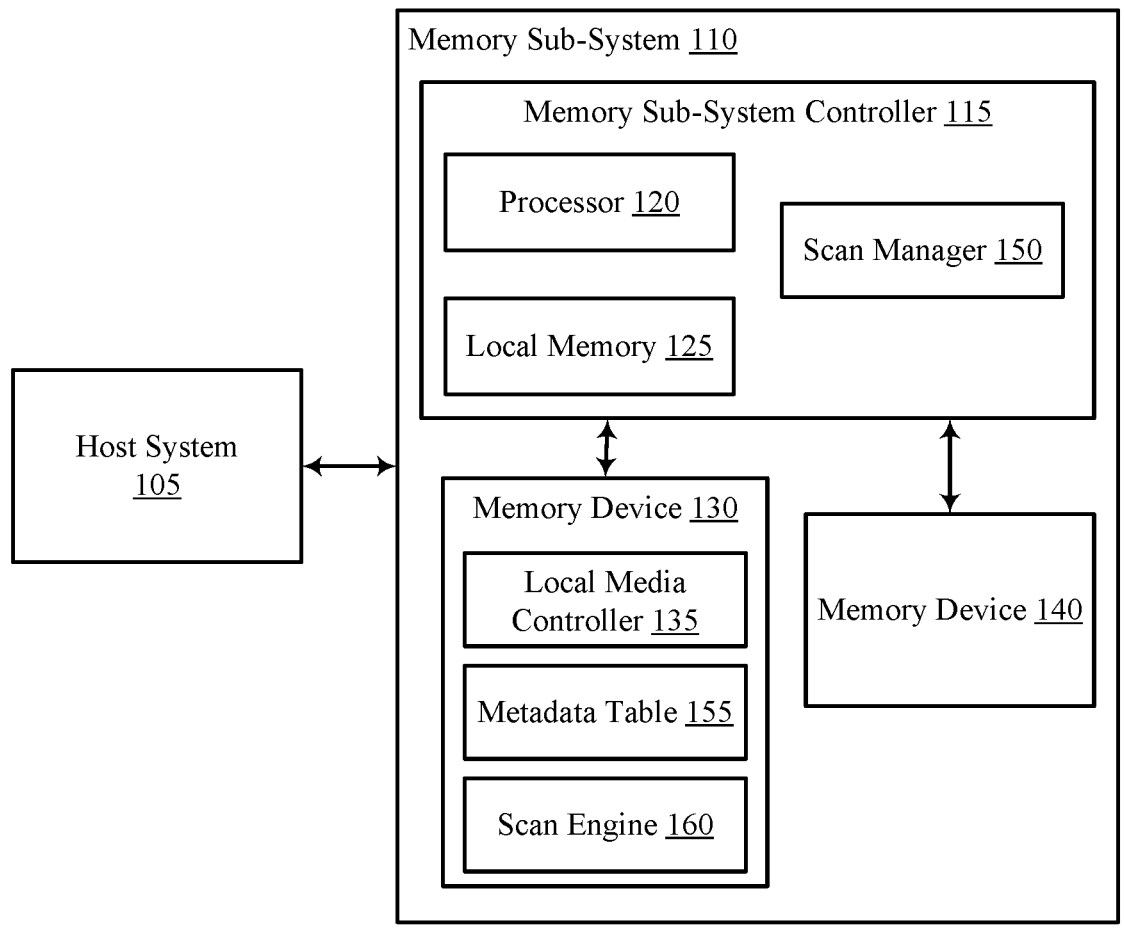
FIG. 1 illustrates an example of a computing environment in accordance with examples as disclosed herein.

Aspects of the present disclosure are directed to scanning techniques for a media management operation of a memory sub-system. A memory sub-system can be a storage device, a memory module, or a hybrid of a storage device and memory module. Examples of storage devices and memory modules are described with reference to FIG. 1. In general, a host system can utilize a memory sub-system that includes one or more memory devices that store data. The host system can provide data to be stored at the memory sub-system and can request data to be retrieved from the memory sub-system.

The memory device can be non-volatile memory device, which is a package of one or more dice. The dice in the packages can be assigned to one or more channels for communicating with a memory sub-system controller. The non-volatile memory devices include cells (i.e., electronic circuits that store information), that are grouped into pages to store bits of data. The non-volatile memory devices can include three-dimensional cross-point ("3D cross-point") memory devices that are a cross-point array of non-volatile memory that can perform bit storage based on a change of bulk resistance, in conjunction with a stackable cross-gridded data access array. Another example of a non-volatile memory device is a negative-and (NAND) memory device. Other examples of non-volatile memory devices are described below in conjunction with FIG. 1.

3D cross-point memory devices can group pages across dice and channels to form management units (MUs). An MU can include user data and corresponding metadata. A memory sub-system controller can send and receive user data and corresponding metadata as management units to and from memory devices. A super management unit (SMU) is a group of one or more MUs that are managed together. For example, a memory sub-system controller can perform media management operations (e.g., wear level operations, refresh operations, etc.) on SMUs. Other examples of media management operations include garbage collection and scrub operations.

The host system can send access requests (e.g., write command, read command) to the memory sub-system, such as to store data on a memory device at the memory sub-system and to read data from the memory device on the memory sub-system. The data to be read or written, as specified by a host request, is hereinafter referred to as "host data".

Access operations can be performed by a memory sub-system on memory devices and can include read operations, erase operations, write operations, and re-write operations. Access operations can cause wear in the memory cell. In some cases, wear of some memory cells can be different than other memory cells within the memory device. Unevenness in the wearing of the memory cells can be due to some memory cells being accessed more frequently than other memory cells. In such examples, the more frequently accessed memory cells within the memory device can have a lower read/write life than other memory cells. As such, the overall life of the memory device can be affected negatively by the more frequently accessed memory cells. The memory sub-system can implement one or more wear-leveling operations to spread access operations across a broader quantity of memory cells and thereby extend the overall life of the memory device.

Wear leveling is a process that helps reduce premature wear in memory devices by distributing write operations across the memory devices. Wear leveling includes a set of operations to determine which physical media (e.g., set of memory cells) to use each time data is programmed to help ensure that certain physical sets of memory cells are not written and erased more often than others. Wear leveling operations can include hot swapping and cold swapping of writing to memory cells. "Hot" hereinafter refers to relatively high frequency of access. "Cold" hereinafter refers to relatively low frequency of access. "Access" hereinafter refers to read, write, and erase. Hot swapping of memory cells can include identifying memory cells for which the number of accesses or (e.g., writes) over a duration of time satisfy a threshold (e.g., the memory cells are "hot" and are being accessed fairly frequently). When the threshold number of operations or write operations is satisfied, the memory sub-system can transfer the data (e.g., host data, metadata)

of the "hot" memory cells to different memory cells to level out the relative wear between the different memory cells.

Aspects of the present disclosure address the above and other deficiencies by having a memory sub-system that can perform or coordinate one or more wear leveling operations. Cold swapping of memory cells can include identifying memory cells for wear-leveling operations that are not being accessed as much as "hot" memory cells for hot swapping described above. For example, the memory sub-system can count the number of write operations (e.g., write counts) performed on memory cells in a mapped region of SMUs (e.g., a region of the SMUs to which memory cells are actively being written). The memory sub-system can compare a minimum number of write operations performed on all SMUs in the mapped region (e.g., the minimum write count) with a minimum number of write operations (e.g., the minimum write count) performed on memory cells in an unmapped region of SMUs (e.g., a region of the SMUs to which memory cells are not actively being written). The memory sub-system can identify the SMU with the minimum write count in the unmapped region. In some cases, when the minimum write count of the SMU in the mapped region is less than the minimum write count of the SMU in the unmapped region, the memory sub-system can swap data stored in the two SMUs. In such cases, the memory sub-system can write to the formerly unmapped SMU (e.g., swapped to the mapped region), and the memory sub-system can stop writing to the formerly mapped SMU (e.g., swapped to the unmapped region). Performing such an operation can more evenly spread the wear between mapped and unmapped SMUs throughout the memory device. The write counts of the SMUs, however, can be difficult to track because the memory sub-system is constantly writing to many SMUs in the memory device. As such the write count can be constantly changing. Therefore, determining the SMU with the minimum write count can be take many clock cycles, in some cases, because the write counts of SMUs can be constantly changing, thereby causing frequent scans of the write counts. Furthermore, performing scans for the current write counts can introduce latency in the memory sub-system's operation because counting the current write count for all SMUs can use a large amount of data processing that can use processing resources of the memory sub-system.

In some embodiments, the memory sub-system can scan a table or other data structure containing a list of access operations performed on SMUs or on the memory cells themselves. The memory sub-system can determine the minimum write counts of the mapped and unmapped SMUs based on the scan. The minimum write counts can be used to trigger cold swapping, as described above. In some cases, hardware, such as a scan engine, can be used to perform the scan of the table or other data structure. The hardware can decrease the latency of the scan, and therefore, increase the performance of the system.

Features of the disclosure are initially described in the context of a computing environment as described with reference to FIG. 1. Features of the disclosure are described in the context of timing diagrams as described with reference to FIGS. 2 and 3. These and other features of the disclosure are further illustrated by and described with reference to an apparatus diagram, and a computing diagram as described with reference to FIGS. 4-5.

FIG. 1 illustrates an example of a computing environment 100 in accordance with examples as disclosed herein. The computing environment can include a host system 105 and a memory sub-system 110. The memory sub-system 110 can include media, such as one or more non-volatile memory devices (e.g., memory device 130), one or more volatile memory devices (e.g., memory device 140), or a combination thereof.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, and a hard disk drive (HDD). Examples of memory modules include a dual in-line memory module (DIMM), a small outline DIMM (SO-DIMM), and a non-volatile dual in-line memory module (NVDIMM).

The computing environment 100 can include a host system 105 that is coupled with a memory system. The memory system can be one or more memory sub-systems 110. In some examples, the host system 105 is coupled with different types of memory sub-systems 110. FIG. 1 illustrates one example of a host system 105 coupled with one memory sub-system 110. The host system 105 uses the memory sub-system 110, for example, to write data to the memory sub-system 110 and read data from the memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 105 can be a computing device such as a desktop computer, laptop computer, network server, mobile device, a vehicle (e.g., airplane, drone, train, automobile, or other conveyance), embedded systems, Internet of Things (IoT) devices, or such computing device that includes a memory and a processing device. The host system 105 can be coupled to the memory sub-system 110 using a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), etc. The physical host interface can be used to transmit data between the host system 105 and the memory sub-system 110. The host system 105 can further utilize an NVM Express (NVMe) interface to access the memory components (e.g., memory devices 130) when the memory sub-system 110 is coupled with the host system 105 by the PCIe interface. The physical host interface can provide an interface for passing control, address, data, and other signals between the memory sub-system 110 and the host system 105.

The memory devices can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

An example of non-volatile memory devices (e.g., memory device 130) includes a 3D cross-point type flash memory, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased.

Although non-volatile memory components such as 3D cross-point type memory are described, the memory device 130 can be based on any other type of non-volatile memory, such as negative-and (NAND), read-only memory (ROM), phase change memory (PCM), self-selecting memory, other chalcogenide based memories, ferroelectric random access memory (FeRAM), magneto random access memory (MRAM), negative-or (NOR) flash memory, and electrically erasable programmable read-only memory (EEPROM).

In some embodiments, each of the memory devices 130 can include one or more arrays of memory cells such as single level cells (SLCs), multi-level cells (MLCs), triple level cells (TLCs), quad-level cells (QLCs), or a combination of such. In some examples, a particular memory component can include an SLC portion, and an MLC portion, a TLC portion, or a QLC portion of memory cells. Each of the memory cells can store one or more bits of data used by the host system 105.

The memory sub-system controller 115 can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processor 120 (e.g., a processing device) configured to execute instructions stored in a local memory 125. In the illustrated example, the local memory 125 of the memory sub-system controller 115 includes an embedded memory configured to store instructions for performing various processes, operations, logic flows, and routines that control operation of the memory sub-system 110, including handling communications between the memory sub-system 110 and the host system 105.

In some examples, the local memory 125 can include memory registers storing memory pointers, fetched data, etc. The local memory 125 can also include read-only memory (ROM) for storing micro-code. While the example memory sub-system 110 in FIG. 1 has been illustrated as including the memory sub-system controller 115, in another example of the present disclosure, a memory sub-system 110 cannot include a memory sub-system controller 115, and can instead rely upon external control (e.g., provided by an external host, or by a processor or controller separate from the memory sub-system).

In general, the memory sub-system controller 115 can receive commands or operations from the host system 105 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical address (e.g., LBA) and a physical address that are associated with the memory devices 130. The memory sub-system controller 115 can further include host interface circuitry to communicate with the host system 105 via the physical host interface. The host interface circuitry can convert the commands received from the host system into command instructions to access the memory devices 130 as well as convert responses associated with the memory devices 130 into information for the host system 105.

The memory sub-system 110 can also include additional circuitry or components that are not illustrated. In some examples, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, the memory devices 130 can be locally managed memory devices, which is a raw memory device combined with a local media controller 135 that performs memory management operations on the memory device 130 within the same memory device package.

The memory sub-system 110 includes a scan manager 150 that can use a metadata table 155 and a scan engine 160 to determine the write counts of the SMUs within memory device 130. Functions of the scan manager 150 can be implemented by the memory sub-system 110, the memory sub-system controller 115, the memory device 130, the local media controller 135, or combinations thereof. The metadata table 155 can log the occurrences of write operations on memory cells within the memory device 130. In some examples, the metadata table 155 can be part of the local media controller 135. However, in some examples, the metadata table 155 can be separate from the local media controller 135 in memory device 130. In some examples, the metadata table 155 can be scanned by the memory sub-system controller 115. The memory sub-system controller 115 can retrieve the data stored in the metadata table and can determine if wear leveling operations should be triggered. Triggering of wear leveling operations by the memory sub-system controller 115 can be based upon the write counts of memory cells in the SMUs of the memory device 130. Such embodiments can use larger amounts of processing resources and/or communication resources, which can be due to the signaling between the memory sub-system controller 115 and the memory device 130 used to perform such operations. In other embodiments, dedicated hardware within the memory device 130 can be configured to scan the metadata table 155 and determine if wear leveling operations should be triggered. In some cases, the dedicated hardware can be an example of a scan engine 160. In some examples, memory sub-system controller 115 includes at least a portion of the scan manager 150. For example, the memory sub-system controller 115 can include a processor 120 (e.g., a processing device) configured to execute instructions stored in local memory 125 for performing the operations described herein. In some examples, the scan manager 150 is part of the host system 105, an application, or an operating system.

The memory sub-system 110 can include a scan manager 150 that uses a scan engine 160 to scan the metadata table 155 and determine the write counts of the SMUs within the memory device 130. The scan engine 160 can scan the metadata table 155 to determine the write counts of SMUs in regions of memory device 130 where data is actively being written to (e.g., the mapped regions of memory device 130). The scan engine 160 can also scan the metadata table 155 to determine the write counts of SMUs in the regions of memory device 130 where data is not actively being written to (e.g., the unmapped regions of memory device 130). The scan engine 160 can determine the SMU that has the minimum write count in both the mapped region and the unmapped region.

The scan manager 150 can use the scan engine 160 to can scan the metadata table 155 independently of memory sub-system controller 115. In such cases, the processing capabilities of memory sub-system controller 115 cannot be affected by the scanning of metadata table 155. This can improve latency in the operation of the memory sub-system 110. Scan engine 160 can also scan the metadata table 155 faster than by other methods, such as by memory sub-system controller 115. In such cases, the latency in determining the write counts of the SMUs can be lowered. Therefore, the write counts used for wear-leveling can be more accurate because the scan of metadata table 155 occurs faster than by other methods. Further details with regards to the operations of the scan manager 150, metadata table 155, and scan engine 160 are described below.

Figure 2:
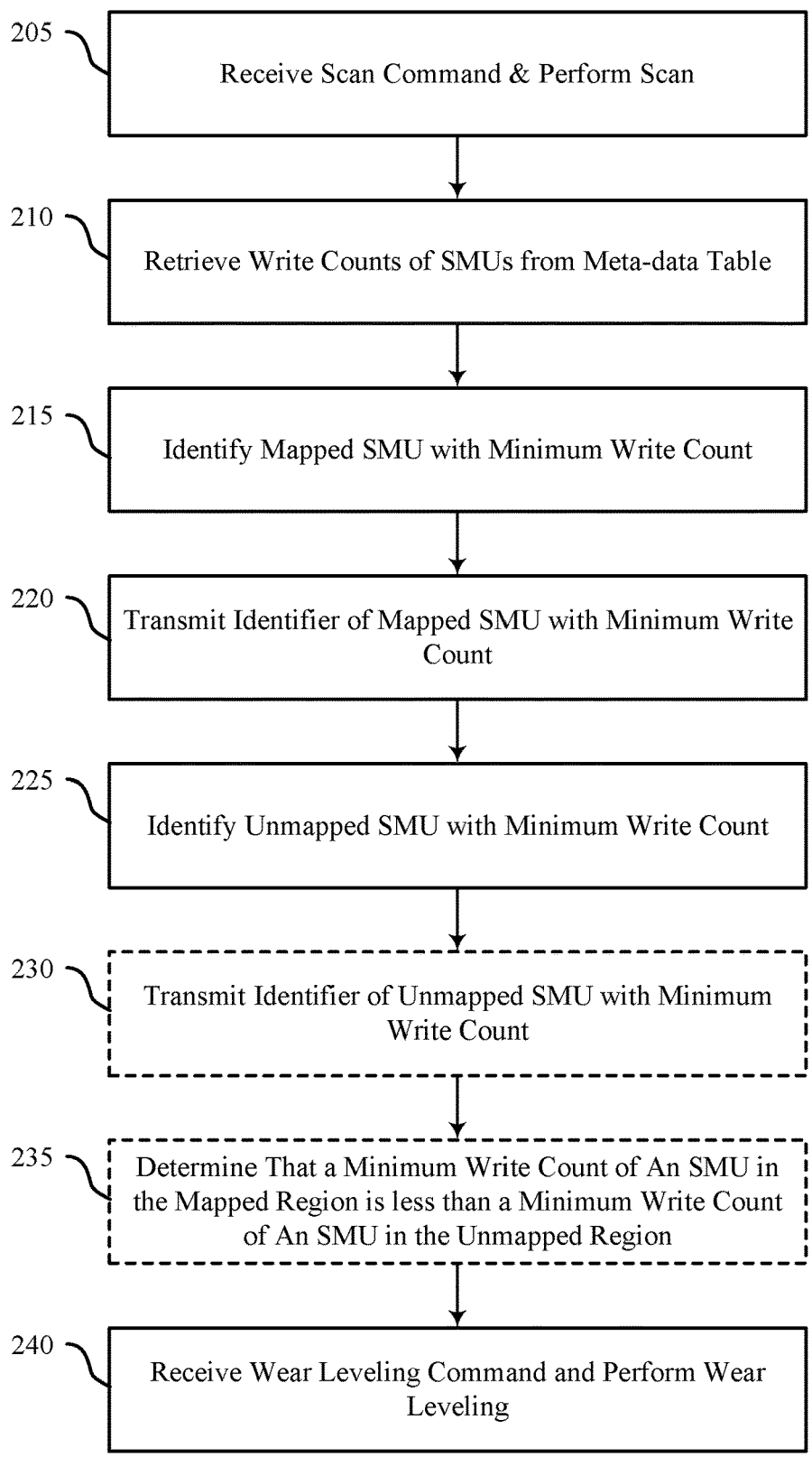
FIG. 2 illustrates an example of a memory device process flow that supports scanning techniques for a media management operation of a memory sub-system in accordance with examples as disclosed herein.

FIG. 2 illustrates an example of a method 200 that supports scanning techniques for a media management operation of a memory sub-system. In some examples, the method 200 can be performed by a memory sub-system, a memory device, or combinations thereof, which can be examples of memory sub-system 110 or a memory device 130 described with reference to FIG. 1.

The method 200 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 200 can be performed by local media controller 135 of FIG. 1. In other embodiments, the method 200 can be performed additionally or alternatively by memory sub-system controller 115 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are used in every embodiment. Other process flows are possible.

The memory sub-system can receive access commands from the host system. Such access commands can be read commands, write commands, or erase commands which can read, erase, write, and/or re-write data to specific memory cells in memory devices of the memory sub-system. In some cases writing data in the memory cells can cause the memory cells to wear, which can limit the life of the memory cells within the memory sub-system. In some cases, if the wear of the memory sub-system is left unchecked, the life of the memory sub-system can be decreased.

To reduce the impact of wear caused by access operations (e.g., write operation) on the memory cells in the memory sub-system, wear leveling operations can be used. In some examples, wear leveling can limit the impact of wear caused by rotating which SMUs or memory cells store data that is accessed frequently or are mapped to uses that cause the SMUs' memory cells to be accessed frequently. Wear leveling can be a process that helps reduce premature wear in memory devices by distributing write operations across the SMUs of the memory devices. Wear leveling can include a set of operations to determine which physical media (e.g., set of memory cells) to use. Each time data is programmed to help ensure that certain physical sets of memory cells are not written more often than others. Wear leveling can allow for the wear of a specific memory cell to be similar to the wear experienced by the other memory cells within the memory sub-system (e.g., the wear across different cells can be leveled). In some examples, even distribution of the write operations across the different cells of the memory sub-system can ensure that specific memory cells are not written to more often than other memory cells.

Wear leveling can include transferring data from a "hot" SMU to an SMU that is relatively less active. In such cases, hot swapping of memory cells within SMUs can be based on the maximum number of write operations that memory cells within an SMU undergo satisfying a threshold. Hot swapping of memory cells can include identifying memory cells for which the number of accesses or writes over a duration of time satisfy a threshold (e.g., the memory cells are "hot" and are being accessed fairly frequently). When the threshold number of operations or write operations is satisfied, the memory sub-system can transfer the data of the "hot" memory cells to different memory cells to level out the relative wear between the different memory cells. For example, the memory sub-system can count the number of write operations performed on the memory cells with an SMU that is being actively written to (e.g., a fresh write count). A threshold (e.g., limit) of write operations can be set by the memory sub-system controller and/or the host device and communicated to the local media controller. When the threshold number of write operations is satisfied (e.g., the fresh write count is greater than or equal to the threshold), the memory sub-system can transfer the data of the "hot" memory cells to different memory cells to level out the relative wear between the different memory cells. The swapping of the data once the threshold is reached can be triggered by the memory sub-system controller, the local media controller, or the host device. The hot swapping of data in the hot memory cells to a different SMU can mitigate excessive wear on certain memory cells in specific SMUs by limiting the maximum number of active writes that an SMU can undergo.

Wear leveling can include cold swapping of data stored in memory cells or SMUs. Cold swapping of memory cells can include identifying memory cells for wear-leveling operations that are not being accessed as much as "hot" memory cells for hot swapping described above. In this case, cold swapping of data stored in memory cells within SMUs can evenly distribute the minimum number of write operations performed on memory cells throughout the SMUs in the memory device. Cold swapping can involve coordination of a memory sub-system controller and a local media controller such as memory sub-system controller 115 and local media controller 135 as described with reference to FIG. 1. In some cases, the local media controller can include dedicated hardware such as a scan engine and a metadata table (e.g., scan engine 160 and metadata table 155 as described with reference to FIG. 1). However, in some examples, the dedicated hardware and the metadata table can be independent from the local media controller in the memory device.

At operation 205, the local media controller can receive a scan command from the memory sub-system controller. In some examples, the memory sub-system can receive, from firmware of the memory sub-system, a command to perform a scan of the SMUs of the memory sub-system and perform the scan of the SMUs based at least in part on receiving the command, where identifying the first SMU is based at least in part on performing the scan. The scan command can trigger a scan of the metadata table. The scan can be used to determine the write counts for each SMU in the memory device or each SMU in a mapped region of the memory device. The write counts of the SMUs can be used to identify the SMUs with the minimum write counts in the mapped and unmapped regions of the memory device.

The metadata table can contain a log of the access operations (e.g., write operations) performed on the SMUs or the memory cells within the memory device. The scan can involve analyzing at least a portion of the metadata in the table to determine the number of accesses that each SMU or each memory cell has undergone. The write count of each of the SMUs can be based upon how many write operations have been performed on the memory cells within each SMU. As such, the amount of data contained in the metadata table can be very large (e.g., the order of gigabits of data). In such cases, the memory sub-system controller can use a large amount of time and/or processing capabilities to scan the metadata table and determine the write counts. This can introduce latency into the system because resources in the memory sub-system controller can need to be dedicated to scanning the metadata table to determine the write counts for each SMU rather than other operations. Additionally, due to the latency in the scan, the write counts determined by the memory sub-system controller cannot be accurate because data can be continuously written to the memory device during the time it takes to scan of the metadata table.

The scan of the metadata table can be performed by dedicated hardware, such as a scan engine. The scan engine can improve the speed and/or efficiency of performing the scan by using hardware components arranged in specific configurations and by reducing signaling between the memory device and the memory sub-system. In such cases, the scan engine can serve as a dedicated piece of hardware within the local media controller of the memory device. The scan engine can scan the metadata table independently from the memory sub-system controller. This can alleviate the processing burden on the memory sub-system controller to scan the metadata table. This can also reduce the power expenditure that the memory sub-system controller would use to scan the metadata table. The scan engine can also scan the metadata table faster than the memory sub-system controller. This can increase the accuracy of the scan. For example, the write counts of the SMUs can constantly change in the mapped area (e.g., the area of the memory device where data is actively being written to) because data is constantly being written to those memory cells. The scan engine can quickly scan the metadata table and report the SMU write counts faster than compared with other scanning methods. This can allow for a more accurate write count to be determined because less time has elapsed from initiating the scan to completion of the scan via utilizing the scan engine.

In a first example, the scan of the metadata table can be performed based upon a frequency (e.g., a periodicity) of scanning which can be determined by the memory sub-system controller. For example, the memory sub-system controller can determine a periodicity with which the scan engine initiates a scan of the metadata table (e.g., every 1 millisecond). The memory sub-system controller can communicate the selected periodicity a variety of ways. In some examples, the memory device can receive a command that includes the periodicity or frequency and then use that periodicity or frequency to initiate the scans on its own. In some examples, the command includes a periodicity for initiating the scan by the hardware component. In some examples, the memory device can receive a command to trigger the scan of the metadata table to the scan engine at every instance of the scan based on the periodicity. In such examples, the memory sub-system controller tracks the selected periodicity. The scan engine cancan scan the metadata table based on receiving of these types of commands. The scan engine can return the write counts of the SMUs to the local media controller after completing the scan.

In a second example, the scan of the metadata table can be performed constantly, and the results of the scan can be reported based upon a frequency (e.g., a periodicity). In this example, the scan engine can initiate a constant scan of the metadata table to determine the write counts of the SMUs. The memory sub-system controller can determine times to receive the result of the scan (e.g., the write counts) on a periodic basis. The memory sub-system controller can communicate the selected periodicity a variety of ways. In some examples, the memory device can receive a command that includes the periodicity or frequency and then use that periodicity or frequency to initiate the scans on its own. In some examples, the memory device can receive a command to the local media controller to return the write counts as an outcome of the scans. In some examples, a command includes a periodicity for transmitting results of the scan to the firmware. The local media controller can then return the write count values to the memory sub-system controller in response to the command. In this case, the latency of the system can be reduced over the embodiments where the scan is triggered by the memory sub-system controller because the local media controller does not need to wait for the completion of the scan to send the write counts.

Some SMUs addresses can be withheld from the scan of the metadata table. For example, the size of the scan can be based upon removing a certain number of SMUs from the scan. In this example, the scan can remove N number of SMUs from the scan. The number of SMUs removed can be the same as the number of SMUs that are not used by the memory device to store data (e.g., O). In this example, if a cold swap occurs, the number of SMUs that are not being used can drop by one (e.g., O=O−1). In some examples, the scan can be initiated (i.e., the frequency of the scan can be determined by) the number of SMUs that are not used in the scan (e.g., N). In some cases the frequency of the scan can be based upon the number of SMUs that are unused in the memory device (e.g., O). For example, in some cases, the frequency of the scan can be based upon the number of SMUs not being used being less than a threshold number, T (e.g., O<T).

The scan of the metadata table can be initiated based upon a threshold of write counts of a SMU in the mapped area. In some examples, the memory subsystem can determine that the first quantity of write counts of the first SMU satisfies a threshold; and initiate a scan of the SMUs of the memory sub-system based at least in part on determining that the first quantity of write counts of the first SMU satisfies the threshold. In some examples, the memory sub-system can receive, from firmware of the memory sub-system, an indication of the threshold, wherein determining that the first quantity of write counts of the first SMU satisfies the threshold is based at least in part on receiving the indication. For example, a threshold number of write counts can be determined and compared against the write count of an SMU in the mapped area. In this example, the scan of the metadata table can occur once the threshold of write counts is reached.

The scan of the metadata table by either the memory sub-system controller and/or the scan engine can determine the minimum write counts of the SMUs in the mapped and unmapped regions of the memory device. As described herein, the mapped region of the memory device can be the regions where data is actively being written to memory cells. The unmapped region can be the region of the memory device where data is not being actively written to. The write counts of the SMUs of the mapped and unmapped regions can be used to determine when wear leveling, such as cold swapping, can be initiated.

At operation 210, the write counts for the SMUs can be retrieved from the metadata table. In some examples, the memory sub-system can retrieve the first quantities of write counts for one or more SMUs from a meta-data table of the memory sub-system where identifying the first quantities of write counts is based at least in part on retrieving the write counts from the meta-data table. For example, the local media controller can retrieve the write counts for the SMUs in the memory device, which can be based upon the scan engine scanning the metadata table. The retrieved write counts can include write counts for either, or both of, the SMUs in the mapped and unmapped regions. The retrieved write counts can be used to determine the minimum write counts of the mapped and unmapped regions.

At operation 215, the SMU with the minimum write count in the mapped region can be identified. In some examples, the memory sub-system can identify first quantities of write counts for one or more SMUs in a mapped region. In some examples, the memory subsystem can identify, by a hardware component of the memory sub-system, a first SMU of one or more SMUs that includes a fewest quantity of write counts of the first quantity of write counts. The scan of the metadata table an determine the write counts for SMUs in the mapped region of the memory device. Each of the SMUs in the mapped region can have a corresponding write count. In some embodiments, the scan engine can identify which SMU has the minimum write count of the SMUs in the mapped region. Alternatively or additionally, the local media controller can identify which SMU has the minimum write count of the SMUs in the mapped region. This SMU's write count can be compared with an SMU's write count in the unmapped region to determine if wear leveling operations are triggered in the memory device.

At operation 220, the local media controller can transmit an identification of the SMU and/or the minimum write count of the mapped region to the memory sub-system controller. In examples, the memory sub-system can transmit, to firmware of the memory sub-system, an identifier of the first SMU based at least in part on identifying the first SMU, wherein performing the wear-leveling operation is based at least in part on transmitting the identifier of the first SMU. The identifier can include the current write count of the SMU with the minimum write count in the mapped region. The identifier can additionally or alternatively include the address of the SMU. In some cases, the identifier can also include the minimum write count in the mapped region of the memory device. The identifier can be used by the memory sub-system controller to determine when wear leveling operations should be triggered.

At operation 225, the SMU with the minimum write count in the unmapped region can be identified. In some examples, the memory sub-system can identify second quantities of write counts for one or more SMUs in the unmapped region. In such examples, the scan of the metadata list can determine the write counts for the SMUs in the unmapped region of the memory device. Each of the SMUs in the unmapped region can have a corresponding write count. In some examples, the local media controller can identify which SMU has the minimum write count of the SMUs in the unmapped region. For example, the memory sub-system can identify the second SMU of one or more SMUs that includes a fewest quantity of write counts based at least in part on identifying the second quantities of write counts for the one or more SMUs, where performing the wear-leveling operation is based at least in part on identifying the second SMU of the one or more SMUs. This SMU's write count can be compared with the SMU's write count in the mapped region to determine if wear leveling operations are triggered in the memory device. In some examples, the memory sub-system can compare the first quantity of write counts with the second quantity of write counts where performing the wear-leveling operation is based at least in part on performing the comparison. In other examples, the minimum write count of the SMU in the unmapped region can be determined by the memory sub-system controller. In such examples, the local media controller and/or the scan engine cannot identify the write counts of the unmapped SMU.

At operation 230, the local media controller can optionally transmit an identification of the SMU with the minimum write count in the unmapped region to the memory sub-system controller. In some examples, the memory sub-system can transmit, to firmware of the memory sub-system, an identifier of the second SMU based at least in part on identifying the second SMU, where performing the wear-leveling operation is based at least in part on transmitting the identifier of the second SMU. The identifier can include the current write count of the SMU with the minimum write count in the unmapped region. The identifier can additionally or alternatively include the address of this SMU within the unmapped region of the memory device. The identifier can be used by the memory sub-system controller to determine when wear leveling operations should be triggered.

At operation 235, the memory sub-system controller can determine if the write count of the SMU with the minimum write count in the mapped region is less than the write count of the SMU with the minimum write count in the unmapped region. For example, the memory sub-system can determine that the first quantity of write counts is less than the second quantity of writes counts, where performing the wear-leveling operation is based at least in part on the determination. In some examples, the memory sub-system controller can compare the write count of the two minimum write count SMUs. If the memory sub-system controller determines that the minimum write count of the SMU in the mapped region is less than the write count of the SMU in the unmapped region, then wear leveling operations can be triggered. In other examples, the memory sub-system controller can determine if the write count of the SMU with the minimum write count in the mapped region is less than the write count of an SMU in the unmapped region, not necessarily being the minimum write count. If the memory sub-system controller determines that the minimum write count of the SMU in the mapped region is less than the write count of the SMU in the unmapped region, then wear leveling operations can be triggered. In some cases, the local media controller can additionally or alternatively compare the write counts, and determine if wear leveling operations can be triggered, rather than the local media controller.

At operation 240, the local media controller can receive a wear leveling command and perform wear leveling operations in the memory device. In some examples, the memory sub-system can receive, from the firmware, a command to perform the wear-leveling operation based at least in part on transmitting the identifier of the first SMU, where performing the wear-leveling operation is based at least in part on receiving the command. The wear leveling command can be based upon the indications of the minimum write counts of the SMUs in the mapped and/or unmapped regions. The indication of the SMUs with the minimum write counts of the mapped and unmapped regions can be used by the memory sub-system controller to determine if the minimum write count of the SMU in the mapped regions is less than the write count of the SMU in the unmapped regions. In this case, when the write count of the SMU with the minimum write count in the mapped region is less than the write count of the SMU with the minimum write count in the unmapped region, then a wear leveling command can be sent to the memory device. This command, which can be based on the memory sub-system controller's determination, can define when wear leveling operations are appropriate in the memory device.

Wear leveling operations can be performed in the memory device based upon the command from the memory sub-system controller. In some examples, the memory subsystem can perform a wear-leveling operation based at least in part on a first quantity of write counts of the first SMU of one or more SMUs in the mapped region being less than a second quantity of writes counts of a second SMU of one or more SMUs in an unmapped region. For example, when the memory device receives the wear leveling command from the memory sub-system controller, swapping of the SMUs can be triggered. In the case of cold swapping, when the command is received, writing data to the SMU with the minimum count in the mapped region can stop, and writing to the SMU with the minimum write count in the unmapped area can begin. In this example, the two SMUs can "swap" being written to, and therefore, "swap" their categorizations of mapped and unmapped. In some cases, the data stored in an SMU in the mapped region can be transferred to an SMU in the unmapped region. This can be performed as part of the wear leveling operation, or in some cases, performed independently of the wear leveling operation. In either case, the metadata table can be updated to reflect the transfer of the data from the SMU in the mapped region to the SMU in the unmapped region. In some examples, the memory sub-system can transfer data stored on the first SMU of the one or more SMUs in the mapped region to at least a portion of the SMUs in the unmapped region, where performing the wear-leveling operation is based at least in part on transferring the data; and update a meta-data table of the memory sub-system based at least in part on transferring the data.

Figure 3:
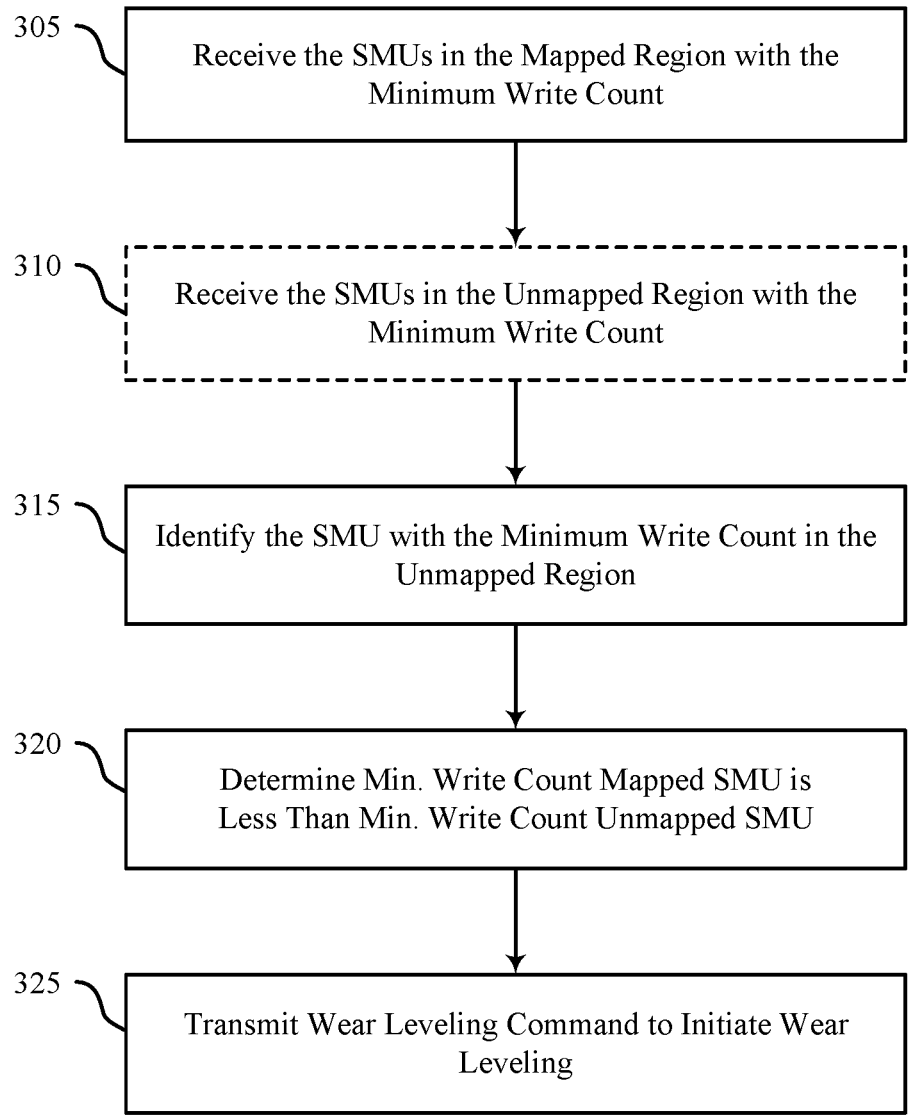
FIG. 3 illustrates an example of a memory sub-system controller process flow that supports scanning techniques for a media management operation of a memory sub-system in accordance with examples as disclosed herein.

FIG. 3 illustrates an example of a method 300 that supports scanning techniques for a media management operation of a memory sub-system. In some examples, the method 300 can be performed by a memory sub-system, a memory device, or combinations thereof, which can be examples of memory sub-system 110 or a memory device 130 described with reference to FIG. 1.

The method 300 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are used in every embodiment. Other process flows are possible.

As described with reference to FIG. 2, the memory sub-system can receive access commands from the host system. Such access commands can be read commands, write commands, or erase commands which can read, erase, write, and/or re-write data to specific memory cells in memory devices of the memory sub-system. In some cases writing data in the memory cells can cause the memory cells to wear, which can limit the life of the memory cells within the memory sub-system. In some cases, if the wear of the memory sub-system is left unchecked, the life of the memory sub-system can be decreased.

As described with reference to FIG. 2, wear leveling operations can be used to reduce the impact of wear caused by access operations on the memory cells in the memory sub-system, and similar to method 200, wear leveling operations can include hot swapping and cold swapping. Also similar to method 200, hot swapping can include the memory sub-system controller (and/or the host device) setting threshold numbers of write operations to limit the amount of times memory cells within a SMU are written to, and when the threshold is reached, "hot swapping" of the data to another SMU can be triggered.

Also similar to the method 200 described with reference to FIG. 2, wear leveling can include cold swapping of data. In this case, cold swapping of data within memory cells within SMUs can evenly distribute the minimum number of write operations performed on memory cells throughout the SMUs in the memory device. Cold swapping can involve coordination of a memory sub-system controller and a local media controller such as memory sub-system controller 115 and local media controller 135 as described with reference to FIG. 1. In some cases, the local media controller can include dedicated hardware such as a scan engine and a metadata table (e.g., scan engine 160 and metadata table 155 as described with reference to FIG. 1). Method 300 can also incorporate the methods of operating memory sub-system controllers, local media controllers, scan engines, and/or metadata tables as described regarding method 200.

At operation 305, the memory sub-system controller can receive the indication of the SMU in the mapped region with the minimum write count. In some examples, the indication can be received as an address of the SMU with the minimum write count in the mapped region. In some examples, the memory sub-system can receive, from a hardware component of a memory sub-system, an indication of a first quantity of write counts of a first super management units (SMU) of one or more SMUs in a mapped region, the first SMU having a fewest quantity of write counts of one or more SMUs. In other examples, the write counts of the SMUs in the mapped region of the memory device can be received from the local media controller. In this case, the write counts of the mapped SMUs can include the SMU with the minimum write count in the mapped region. In some cases, the SMU with the minimum write count in the mapped region can be identified, which can be based upon the write counts received from the local media controller.

At operation 310, the memory sub-system controller can optionally receive an indication of the SMU in the unmapped region with the minimum write count. In some examples, the indication can be received as an address of the SMU with the minimum write count in the unmapped region. In other examples, the write counts of the SMUs in the mapped region of the memory device can be received from the local media controller. In this case, the write counts of the unmapped SMUs can include the SMU with the minimum write count in the unmapped region.

In some embodiments, the memory sub-system controller can retrieve the write counts of SMUs in either, or both of, the mapped or unmapped areas. In some examples, the memory sub-system can receive, from the hardware component, the second quantity of write counts of the second SMU in the unmapped region, where identifying the second quantity is based at least in part on receiving the second quantity. Similar to method 200, the write counts of the SMUs can be based upon the scan of the metadata table, which can be performed by dedicated hardware, such as a scan engine. In some examples, the memory subsystem can retrieve write counts for the second SMU from a metadata table of the memory sub-system, where identifying the second quantity is based at least in part on retrieving the write counts from the metadata table. Also similar to method 200, this can be based upon a periodicity of the memory sub-system controller initiating the scan, and additionally or alternatively, based upon a frequency of the memory sub-system controller receiving the continuous scans output. The SMU write count values can be used to identify the SMUs with the minimum write counts in the mapped and unmapped regions.

At operation 315, the SMU with the minimum write count in the unmapped region can be identified. In some examples, the memory sub-system can identify, by firmware of the memory sub-system, a second SMU of one or more SMUs in an unmapped region. The identification of the SMU with the minimum write count in the unmapped region can be based upon the indication from the local memory controller and/or the write counts of the SMUs in the unmapped region.

The write counts of the SMUs in the mapped and unmapped regions can be compared to determine when wear leveling operations can be initiated. For example, at operation 320, the memory sub-system controller can determine if the write count of the SMU with the minimum write count in the mapped region is less than the write count of the SMU with the minimum write count in the unmapped region. For example, the memory sub-system can determine, by the firmware, that the first quantity of write counts of the first SMU of one or more SMUs in the mapped region is less than a second quantity of write counts of the second SMU of one or more SMUs in the unmapped region. In the case when the write count of the SMU in the mapped region is less than the write count of the SMU in the unmapped region, the memory sub-system controller can determine that wear leveling operations are appropriate. At this time, the memory sub-system controller can initiate cold swapping of the SMUs. In other examples, the memory sub-system controller can determine if the write count of the SMU with the minimum write count in the mapped region is less than the write count of the SMU in the unmapped region not necessarily being the minimum write count. In the case, when the write count of the SMU in the mapped region is less than the write count of the SMU in the unmapped region, the memory sub-system controller can determine that wear leveling operations are appropriate. At this time, the memory sub-system controller can initiate cold swapping of the SMUs. For example, the memory sub-system can initiate a wear-leveling operation based at least in part on determining that the first quantity of write counts is less than the second quantity of write counts.

At operation 325, the memory sub-system controller can transmit a wear leveling command to the memory device. For example, the memory sub-system can transmit a command to the memory subsystem based at least in part on determining that the first quantity is less than the second quantity, wherein initiating the wear-leveling operation is based at least in part on transmitting the command. The wear leveling command can be transmitted based upon the determination that the write count of the SMU in the mapped area is less than the write count of the SMU in the unmapped area. In this case, the wear leveling command can indicate that cold swapping of the SMUs is appropriate. The command can be received by the memory device, which can initiate wear leveling operations. The wear leveling operations, as described with reference to the method 200, can include cold swapping where the SMU with the minimum write count in the mapped region is "swapped" with the SMU with the minimum write count in the unmapped region. In this case, writing to the SMU previously in the unmapped region can begin, and writing to the SMU in the mapped region can end. Therefore, in this case, the SMUs can swap mapped and unmapped regions within the memory device.

Figure 4:
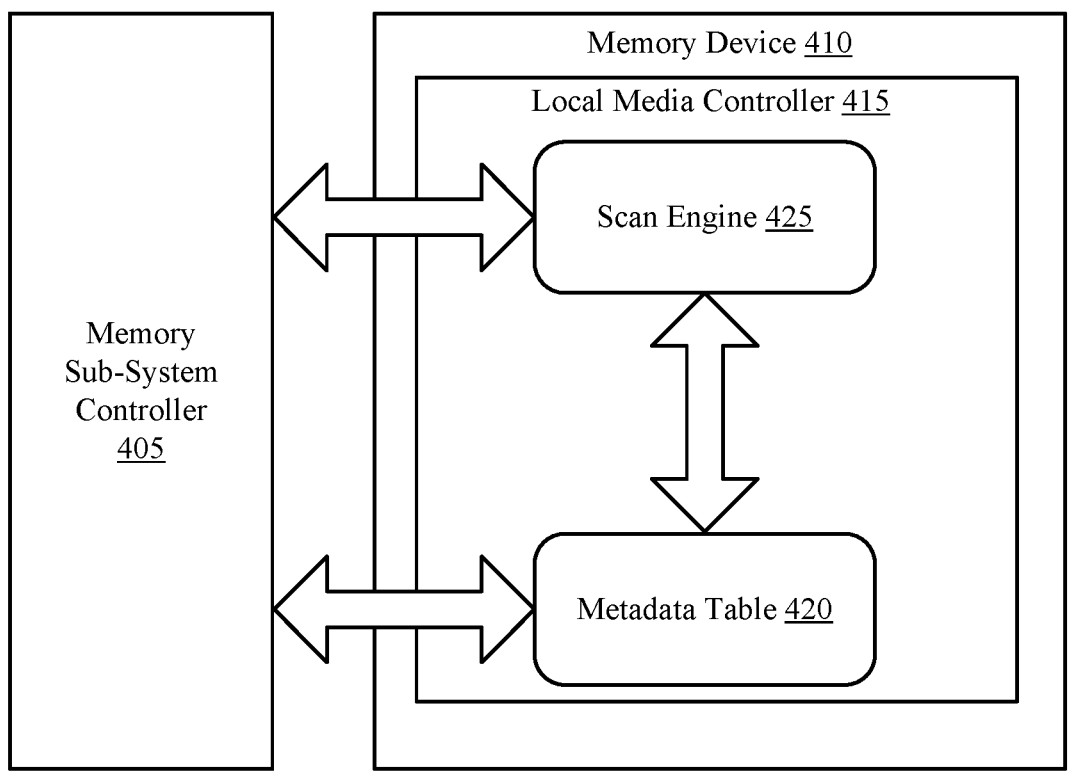
FIG. 4 illustrates an example of a system that supports scanning techniques for a media management operation of a memory sub-system in accordance with examples as disclosed herein.

FIG. 4 illustrates an example of a system 400 that supports scanning techniques for a media management operation of a memory sub-system in accordance with examples as disclosed herein. The system 400 can be an example of a system for an individual set of memory cells within a memory sub-system (such as the memory sub-systems as described with reference to FIGS. 1, 2, and 3). In some cases, system 400 can perform the methods 200 and/or 300 as described with reference to FIGS. 2 and 3.

The system 400 can include a memory sub-system controller 405. The memory sub-system controller can be an example of memory sub-system controller 115 as described with reference to FIG. 1. The system 400 can perform the methods 200 and/or 300 as described with reference to FIGS. 2 and 3. In some cases, the memory sub-system controller 405 can communicate with the memory device 410. For example, the memory sub-system controller can receive an indication of one or more SMUs with minimum write counts from SMUs of the memory device 410 and/or can receive write counts for at least some SMUs of the memory device 410. The write counts can be used to determine when wear leveling operations can be initiated in the memory device 410. As described herein, wear leveling, such as cold swapping, can be initiated when the write count of the SMU with the minimum write count in the mapped region of the memory device 410 is less than the write count of the SMU with the minimum write count of the SMU in the unmapped region of the memory device 410. In this case, the memory sub-system controller 405 can initiate cold swapping of the two SMUs (e.g., by a command), as described with reference to methods 200 and 300.

The system 400 can include a local media controller 415 of the memory device 410. The local media controller 415 can be an example of local media controller 135 as described with reference to FIG. 1. The local media controller 415 can perform at least portions of the methods 200 and/or 300 as described with reference to FIGS. 2 and 3. For example, the local media controller 415 can communicate with the memory sub-system controller 405 and coordinate wear leveling operations, such as cold swapping. In some cases, the local media controller 415 can include a metadata table 420, a scan engine 425, or a combination thereof. The metadata table 420 and the scan engine 425 can be examples of the scan manager 150 and the metadata table 155 as described with reference to FIG. 1.

The metadata table 420 and the scan engine 425 can communicate with each other, and the scan engine 425 can scan the metadata table 420 to determine the write counts of at least some of the SMUs in the memory device 410. The scan engine 425 can be a dedicated piece of hardware, which can scan the metadata table 420. As such, the scanning of metadata table 420 can be performed quickly by the scan engine 425. For example, because the scan engine 425 is a dedicated hardware component used for scanning the metadata table 420, the scan engine 425 can quickly respond to commands (such as commands from the memory sub-system controller 405) to scan the metadata table 420. Additionally or alternatively, the scan engine 425 can continuously scan the metadata table 420 and can quickly report the write counts of the SMUs in response to a command (e.g., from the memory sub-system controller 405). The quick response to commands and/or determination of the write counts of the SMUs can be based on the processing capabilities and power of the scan engine being dedicated to only scanning the metadata table 420. This can decrease the latency in scanning the metadata table 420 and therefore decrease the latency in the operation of the system. This can increase the performance of the system compared with other systems that lack a dedicated hardware component to scan metadata.

The ability for the scan engine 425 to quickly scan the metadata table 420 can increase the accuracy of the scan. For example, traditional scans (e.g., scans performed by the memory sub-system controller 405) can take a relatively long amount of time (e.g., in the order of seconds or minutes). This can be due to the quantity of data contained in metadata table 420 (e.g., gigabits of data) and the processing requirements for analyzing the data at the memory sub-system controller 405. This can introduce latency into the system because the memory sub-system controller 405 can need to dedicate resources to scanning the large amount of data in metadata table 420, rather than dedicating those resources to other operations. However, during the scan, the memory cells within the memory device 410 can be written to. As such, the scan of the metadata table 420 can be inaccurate because the write counts determined from the scan can be based upon out-of-date write counts because the memory cells are being written to during the time when the scan is occurring. Therefore, in this example, the write counts determined by the scan cannot reflect the actual write counts of the SMUs because the scan took such a long duration. The use of a dedicated hardware piece (e.g., the scan engine 425) can decrease the latency of the scan, and therefore increase the accuracy of the write counts. For example, because the scan of the metadata table 420 by scan engine 425 can take less time than by the memory sub-system controller 405, less writes can have occurred to the memory cells in the memory device 410 during the scan. Therefore, the reported write counts for SMUs can be more up-to-date, and therefore more accurate than by a memory sub-system scan. This can improve the accuracy, and thus the performance, of the wear leveling in the system.

It should be noted that the methods described above describe possible implementations, and that the operations and the steps can be rearranged or otherwise modified and that other implementations are possible. Furthermore, portions from two or more of the methods can be combined.

Figure 5:
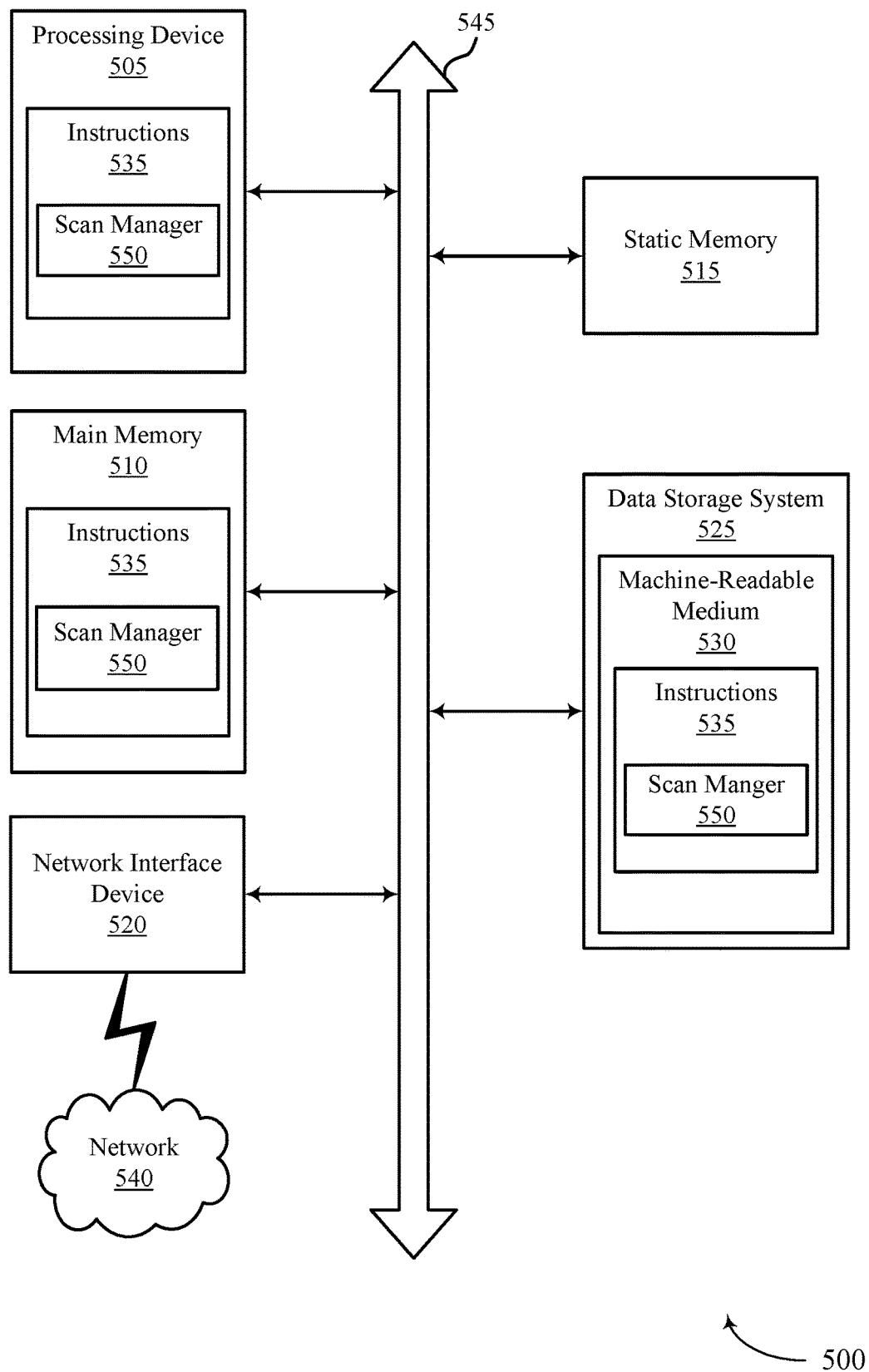
FIG. 5 illustrates an example machine of a computer system that that supports scanning techniques for a media management operation of a memory sub-system in accordance with examples as disclosed herein.

FIG. 5 illustrates an example machine of a computer system 500 that supports scanning techniques for a media management operation of a memory sub-system in accordance with examples as disclosed herein. The computer system 500 can include a set of instructions, for causing the machine to perform any one or more of the techniques described herein. In some examples, the computer system 500 can correspond to a host system (e.g., the host system 105 described with reference to FIG. 1) that includes, is coupled with, or utilizes a memory sub-system (e.g., the memory sub-system 110 described with reference to FIG. 1) or can be used to perform the operations of a controller (e.g., to execute an operating system to perform operations corresponding to the scan manager 150 described with reference to FIG. 1). In some examples, the machine can be connected (e.g., networked) with other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" can also include any collection of machines that individually or jointly execute a set (or multiple sets) of instructions to perform any one or more of the methodologies described herein.

The example computer system 500 can include a processing device 505, a main memory 510 (e.g., read-only memory (ROM), flash memory, DRAM such as SDRAM or RDRAM, etc.), a static memory 515 (e.g., flash memory, static random access memory (SRAM), etc.), and a data storage system 525, which communicate with each other via a bus 545.

Processing device 505 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 505 can also be one or more special-purpose processing devices such as an application specific integrated circuit (ASIC), a field programmable gate array (FPGA), a digital signal processor (DSP), network processor, or the like. The processing device 505 is configured to execute instructions 535 for performing the operations and steps described herein. The computer system 500 can further include a network interface device 520 to communicate over the network 540.

The data storage system 525 can include a machine-readable storage medium 530 (also known as a computer-readable medium) on which is stored one or more sets of instructions 535 or software embodying any one or more of the methodologies or functions described herein. The instructions 535 can also reside, completely or at least partially, within the main memory 510 and/or within the processing device 505 during execution thereof by the computer system 500, the main memory 510 and the processing device 505 also constituting machine-readable storage media. The machine-readable storage medium 530, data storage system 525, and/or main memory 510 can correspond to a memory sub-system.

In one example, the instructions 535 include instructions to implement functionality corresponding to a scan manager 550 (e.g., the scan manager 150 described with reference to FIG. 1). While the machine-readable storage medium 530 is shown as a single medium, the term "machine-readable storage medium" can include a single medium or multiple media that store the one or more sets of instructions. The term "machine-readable storage medium" can also include any medium that is capable of storing or encoding a set of instructions for execution by the machine and that cause the machine to perform any one or more of the methodologies of the present disclosure. The term "machine-readable storage medium" can include, but not be limited to, solid-state memories, optical media, and magnetic media.

Information and signals described herein can be represented using any of a variety of different technologies and techniques. For example, data, instructions, commands, information, signals, bits, symbols, and chips that can be referenced throughout the above description can be represented by voltages, currents, electromagnetic waves, magnetic fields or particles, optical fields or particles, or any combination thereof. Some drawings can illustrate signals as a single signal; however, it will be understood by a person of ordinary skill in the art that the signal can represent a bus of signals, where the bus can have a variety of bit widths.

The terms "electronic communication," "conductive contact," "connected," and "coupled" can refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) can be an open circuit or a closed circuit based on the operation of the device that includes the connected components. The conductive path between connected components can be a direct conductive path between the components or the conductive path between connected components can be an indirect conductive path that can include intermediate components, such as switches, transistors, or other components. In some cases, the flow of signals between the connected components can be interrupted for a time, for example, using one or more intermediate components such as switches or transistors.

The term "coupling" refers to condition of moving from an open-circuit relationship between components in which signals are not presently capable of being communicated between the components over a conductive path to a closed-circuit relationship between components in which signals are capable of being communicated between components over the conductive path. When a component, such as a controller couples other components together, the component initiates a change that allows signals to flow between the other components over a conductive path that previously did not permit signals to flow.

The devices discussed herein, including a memory array, can be formed on a semiconductor substrate, such as silicon, germanium, silicon-germanium alloy, gallium arsenide, gallium nitride, etc. In some cases, the substrate is a semiconductor wafer. In other cases, the substrate can be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, can be controlled through doping using various chemical species including, but not limited to, phosphorous, boron, or arsenic. Doping can be performed during the initial formation or growth of the substrate, by ion-implantation, or by any other doping means.

A switching component or a transistor discussed herein can represent a field-effect transistor (FET) and comprise a three terminal device including a source, drain, and gate. The terminals can be connected to other electronic elements through conductive materials, e.g., metals. The source and drain can be conductive and can comprise a heavily-doped, e.g., degenerate, semiconductor region. The source and drain can be separated by a lightly-doped semiconductor region or channel. If the channel is n-type (i.e., majority carriers are signals), then the FET can be referred to as a n-type FET. If the channel is p-type (i.e., majority carriers are holes), then the FET can be referred to as a p-type FET. The channel can be capped by an insulating gate oxide. The channel conductivity can be controlled by applying a voltage to the gate. For example, applying a positive voltage or negative voltage to an n-type FET or a p-type FET, respectively, can result in the channel becoming conductive. A transistor can be "on" or "activated" when a voltage greater than or equal to the transistor's threshold voltage is applied to the transistor gate. The transistor can be "off" or "deactivated" when a voltage less than the transistor's threshold voltage is applied to the transistor gate.

The description set forth herein, in connection with the appended drawings, describes example configurations and does not represent all the examples that can be implemented or that are within the scope of the claims. The term "exemplary" used herein means "serving as an example, instance, or illustration," and not "preferred" or "advantageous over other examples." The detailed description includes specific details to providing an understanding of the described techniques. These techniques, however, can be practiced without these specific details. In some instances, well-known structures and devices are shown in block diagram form to avoid obscuring the concepts of the described examples.

In the appended figures, similar components or features can have the same reference label. Further, various components of the same type can be distinguished by following the reference label by a dash and a second label that distinguishes among the similar components. If just the first reference label is used in the specification, the description is applicable to any one of the similar components having the same first reference label irrespective of the second reference label.

The various illustrative blocks and modules described in connection with the disclosure herein can be implemented or performed with a general-purpose processor, a DSP, an ASIC, an FPGA or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices (e.g., a combination of a DSP and a microprocessor, multiple microprocessors, one or more microprocessors in conjunction with a DSP core, or any other such configuration).

The functions described herein can be implemented in hardware, software executed by a processor, firmware, or any combination thereof. If implemented in software executed by a processor, the functions can be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions can also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" can be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium can be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein can be applied to other variations without departing from the scope of the disclosure. Thus, the disclosure is not limited to the examples and designs described herein, but is to be accorded the broadest scope consistent with the principles and novel features disclosed herein.

What is claimed is:

1. A method, comprising:
   receiving, from firmware of a memory sub-system, a command to perform a scan of super management units (SMUs) of the memory sub-system, wherein the command comprises a periodicity for transmitting results of the scan to the firmware;
   identifying first quantities of write counts for a first plurality of SMUs in a mapped region based at least in part on receiving the command;
   identifying, by a hardware component, a first SMU of the first plurality that includes a fewest quantity of write counts of the first quantities of write counts, wherein the hardware component identifies the first SMU of the first plurality based at least in part on the hardware component scanning a metadata table independently of a memory sub-system controller; and
   performing a wear-leveling operation based at least in part on a first quantity of write counts of the first SMU of the first plurality in the mapped region being less than a second quantity of write counts of a second SMU of a second plurality of SMUs in an unmapped region, wherein the first quantity is a minimum write count of the first quantities of write counts in the mapped region, and the second quantity is a minimum write count of second quantities of write counts in the unmapped region.

2. The method of claim 1, further comprising:
   transmitting, to the firmware of the memory sub-system, an identifier of the first SMU based at least in part on identifying the first SMU, wherein performing the wear-leveling operation is based at least in part on transmitting the identifier of the first SMU.

3. The method of claim 2, further comprising:
   receiving, from the firmware, a command to perform the wear-leveling operation based at least in part on transmitting the identifier of the first SMU, wherein performing the wear-leveling operation is based at least in part on receiving the command.

4. The method of claim 2, wherein transmitting the identifier is based at least in part on the periodicity indicated in the command.

5. The method of claim 1, further comprising:
   retrieving the first quantities of write counts for the first plurality of SMUs from the metadata table, wherein identifying the first quantities of write counts is based at least in part on retrieving the first quantities of write counts from the metadata table.

6. The method of claim 1, further comprising:
   identifying second quantities of write counts for the second plurality of SMUs in the unmapped region; and
   identifying the second SMU of the second plurality that includes a fewest quantity of write counts based at least in part on identifying the second quantities of write counts for the second plurality, wherein performing the wear-leveling operation is based at least in part on identifying the second SMU of the second plurality.

7. The method of claim 6, further comprising:
   transmitting, to the firmware of the memory sub-system, an identifier of the second SMU based at least in part on identifying the second SMU, wherein performing the wear-leveling operation is based at least in part on transmitting the identifier of the second SMU.

8. The method of claim 1, further comprising:
   performing the scan of the SMUs based at least in part on receiving the command, wherein identifying the first SMU is based at least in part on performing the scan.

9. The method of claim 1, further comprising:
   determining that the first quantity of write counts of the first SMU satisfies a threshold; and
   initiating a scan of the SMUs of the memory sub-system based at least in part on determining that the first quantity of write counts of the first SMU satisfies the threshold.

10. The method of claim 9, further comprising:
    receiving, from the firmware of the memory sub-system, an indication of the threshold, wherein determining that the first quantity of write counts of the first SMU satisfies the threshold is based at least in part on receiving the indication.

11. The method of claim 1, further comprising: comparing the first quantity of write counts with the second quantity of write counts, wherein performing the wear-leveling operation is based at least in part on performing the comparison.

12. The method of claim 1, further comprising: transferring data stored on the first SMU of the first plurality in the mapped region to at least a portion of the SMUs in the unmapped region, wherein performing the wear-leveling operation is based at least in part on transferring the data; and updating the metadata table of the memory sub-system based at least in part on transferring the data.

13. A method, comprising: transmitting a command to perform a scan of super management units (SMUs) of a memory sub-system, wherein the command comprises a periodicity for transmitting results of the scan to firmware of the memory sub-system; receiving, by the firmware of the memory sub-system and from a hardware component of the memory sub-system, signaling comprising an indication of a first quantity of write counts of a first SMU of a first plurality of SMUs in a mapped region, the first SMU having a fewest quantity of write counts of the first plurality of SMUs, wherein the first SMU is identified based at least in part on the hardware component scanning a metadata table independently of a memory sub-system controller of the memory sub-system, the firmware of the memory sub-system receiving results of the scan to the firmware caused to be transmitted by the hardware component based at least in part on the periodicity; identifying, by the firmware, a second SMU of a second plurality of SMUs in an unmapped region; determining, by the firmware, that the first quantity of write counts of the first SMU of the first plurality in the mapped region is less than a second quantity of write counts of the second SMU of the second plurality of SMUs in the unmapped region, wherein the first quantity is a minimum write count in the mapped region, and the second quantity is a minimum write count in the unmapped region; and initiating a wear-leveling operation based at least in part on determining that the first quantity is less than the second quantity.

14. The method of claim 13, further comprising: receiving, from the hardware component, the second quantity of write counts of the second SMU in the unmapped region, wherein identifying the second quantity is based at least in part on receiving the second quantity.

15. The method of claim 13, further comprising: retrieving the second quantity of write counts for the second SMU from the metadata table of the memory sub-system, wherein identifying the second quantity is based at least in part on retrieving the write counts from the metadata table.

16. The method of claim 13, further comprising: transmitting a command to the memory sub-system based at least in part on determining that the first quantity is less than the second quantity, wherein initiating the wear-leveling operation is based at least in part on transmitting the command.

17. A system, comprising: a plurality of memory components; and a processor, operatively coupled with the plurality of memory components, to: receive a command to perform a scan of super management units (SMUs), wherein the command comprises a periodicity for transmitting results of the scan to firmware; identify first quantities of write counts for a first plurality of SMUs in a mapped region based at least in part on receiving the command; identify, by a hardware component, a first SMU of the first plurality that includes a fewest quantity of write counts of the first quantities of write counts, wherein the hardware component identifies the first SMU of the first plurality based at least in part on the hardware component scanning a metadata table independently of a memory sub-system controller; and perform a wear-leveling operation based at least in part on a first quantity of write counts of the first SMU of the first plurality in the mapped region being less than a second quantity of write counts of a second SMU of a second plurality of SMUs in an unmapped region, wherein the first quantity is a minimum write count of the first quantities of write counts in the mapped region, and the second quantity is a minimum write count of second quantities of write counts in the unmapped region.

18. The system of claim 17, wherein the processor is further operable to: transmit, to the firmware, an identifier of the first SMU based at least in part on identifying the first SMU, wherein performing the wear-leveling operation is based at least in part on transmitting the identifier of the first SMU.

19. The system of claim 18, wherein the processor is further operable to: receive, from the firmware, a command to perform the wear-leveling operation based at least in part on transmitting the identifier of the first SMU, wherein performing the wear-leveling operation is based at least in part on receiving the command.

20. The system of claim 17, wherein the processor is further operable to: retrieve the first quantities of write counts for the first plurality of SMUs from the metadata table, wherein the first quantities of write counts are identified based at least in part on retrieving the first quantities of write counts from the metadata table.

* * * * *